United States Patent [19]
Hackett

[11] Patent Number: 5,931,131
[45] Date of Patent: Aug. 3, 1999

[54] VALVE COVER ASSEMBLY HAVING AN INTEGRATED HEAT EXCHANGER FOR COOLING EXHAUST GASES

[75] Inventor: David E. Hackett, Washington, Ill.

[73] Assignee: Caterpillar Inc., Peoria, Ill.

[21] Appl. No.: 08/914,548

[22] Filed: Aug. 19, 1997

[51] Int. Cl.[6] .................................................. F02B 77/00
[52] U.S. Cl. ............................ 123/90.38; 123/195 C; 123/568.12
[58] Field of Search ........................... 123/90.38, 198 E, 123/195 C, 568.12

[56] References Cited

U.S. PATENT DOCUMENTS

| | | | |
|---|---|---|---|
| D. 324,867 | 3/1992 | Lyndhurst et al. | D15/5 |
| 1,788,077 | 1/1931 | Zaikowsky | 123/568.12 |
| 2,408,846 | 10/1946 | Golden et al. | 123/568.12 |
| 2,421,406 | 6/1947 | Bicknell | 123/568.12 |
| 3,682,151 | 8/1972 | Tatsutomi | 123/119 A |
| 3,937,196 | 2/1976 | Cook et al. | 123/568.12 |
| 4,300,511 | 11/1981 | Lang | 123/520 |
| 4,688,524 | 8/1987 | Takahashi | 123/90.38 |
| 4,993,375 | 2/1991 | Akihiko | 123/90.38 |
| 5,285,754 | 2/1994 | Bell | 123/90.38 |
| 5,323,745 | 6/1994 | Sato et al. | 123/90.38 |
| 5,474,035 | 12/1995 | Ming et al. | 123/90.38 |
| 5,490,488 | 2/1996 | Aversa et al. | 123/570 |
| 5,513,604 | 5/1996 | Clement | 123/90.38 |
| 5,682,746 | 11/1997 | von Hoerner | 60/605.2 |

FOREIGN PATENT DOCUMENTS

1-177446  7/1989  Japan .

Primary Examiner—Weilun Lo
Attorney, Agent, or Firm—Maginot & Addison

[57] ABSTRACT

A method of covering a valve and rocker arm area of an internal combustion engine is disclosed. The engine includes an engine exhaust outlet and an engine air inlet. The method includes the step of providing a valve cover assembly which includes a housing having a chamber defined therein, and a conduit positioned in the chamber. The conduit connects the engine exhaust outlet to the engine air inlet. The method also includes the step of securing the valve cover assembly to the engine so that the cover portion of the valve cover assembly covers the valve and rocker arm area. The method further includes the step of advancing exhaust gas from the engine exhaust outlet to the engine air inlet through the conduit. The method still further includes the step of advancing fluid through the housing so as to cool the conduit. A valve cover assembly for use on an internal combustion engine is also disclosed.

17 Claims, 7 Drawing Sheets

VALVE COVER ASSEMBLY HAVING AN INTEGRATED HEAT EXCHANGER FOR COOLING EXHAUST GASES

TECHNICAL FIELD OF THE INVENTION

The present invention relates generally to a valve cover assembly for an internal combustion engine, and more specifically to a valve cover assembly having an integrated heat exchanger for cooling exhaust gases.

BACKGROUND OF THE INVENTION

During operation of an internal combustion engine, it is desirable to control the formation and emission of certain gases, such as the oxides of nitrogen ($NO_x$). One method of achieving this result is the use of exhaust gas recirculation (EGR) which is a process whereby exhaust gases are selectively routed from the exhaust manifold to the intake manifold of the internal combustion engine. The use of EGR reduces the amount of $NO_x$ produced during operation of the internal combustion engine. In particular, $NO_x$ is produced when nitrogen and oxygen are combined at high temperatures associated with combustion. The presence of chemically inert gases, such as those gases found in the exhaust of the engine, inhibits nitrogen atoms from bonding with oxygen atoms thereby reducing $NO_x$ production.

While the use of inert exhaust gases in the above manner reduces $NO_x$ production, engine performance may be disadvantageously affected by the introduction of the exhaust gases into the intake manifold of the engine. In particular, the exhaust gases are generally extremely hot when introduced into the engine. The additional heat associated with the exhaust gases may decrease the efficiency of the engine. In order to reduce the effects of the hot gases, a heat exchanger, or cooler, is installed to cool the hot exhaust gases prior to introducing the exhaust gases into the intake manifold of the engine. This allows $NO_x$ reduction, yet lessens the disadvantageous effects of the additional heat associated with the exhaust gases.

One type of internal combustion engine, which is commonly used in heavy machinery, is known as a "cross flow engine". In a cross flow engine, the intake manifold is mounted on the opposite side of the engine from the exhaust manifold. If an EGR system is installed on a cross flow engine, exhaust gases must be routed over, under, or around the periphery of the engine in order to be advanced from the exhaust manifold to the intake manifold. One drawback associated with mounting an EGR system on a cross flow engine is that there is often inadequate space in the engine compartment for mounting the cooler and associated lines onto the engine. Furthermore, it is often difficult to route the associated lines from one side of the engine to the other due to the number and configuration of the engine components that are positioned between the exhaust manifold and the intake manifold.

What is needed, therefore, is an apparatus and method for cooling exhaust gases which overcome one or more of the above-mentioned drawbacks.

SUMMARY OF THE INVENTION

In accordance with a first embodiment of the present invention, there is provided a method of covering a valve and rocker arm area of an internal combustion engine. The engine includes an engine exhaust outlet and an engine air inlet. The method includes the step of providing a valve cover assembly which includes a housing having a chamber defined therein and a conduit positioned in the chamber. The conduit connects the engine exhaust outlet to the engine air inlet. The method also includes the step of securing the valve cover assembly to the engine so that the cover portion of the valve cover assembly covers the valve and rocker arm area. The method further includes the step of advancing exhaust gas from the engine exhaust outlet to the engine air inlet through the conduit. The method still further includes the step of advancing fluid through the housing so as to cool the conduit.

In accordance with a second embodiment of the present invention, there is provided an engine assembly. The assembly includes an internal combustion engine having a valve and rocker arm area. The assembly also includes a housing having a chamber defined therein. The housing further defines a coolant inlet, a coolant outlet, a first housing exhaust inlet and a first housing exhaust outlet. The housing further includes a cover portion mounted to the engine so as to cover the valve and rocker arm area. The assembly further includes a first conduit positioned in the chamber which connects the first housing exhaust inlet to the first housing exhaust outlet.

In accordance with a third embodiment of the present invention, there is provided a valve cover assembly for use on an internal combustion engine. The valve cover assembly includes a housing having a chamber defined therein. The housing further defines a coolant inlet, a coolant outlet, a first housing exhaust inlet and a first housing exhaust outlet. The housing further includes a cover portion which covers a valve and rocker arm area of the engine, and a first conduit positioned in the chamber. The conduit connects the first housing exhaust inlet to the first housing exhaust outlet.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
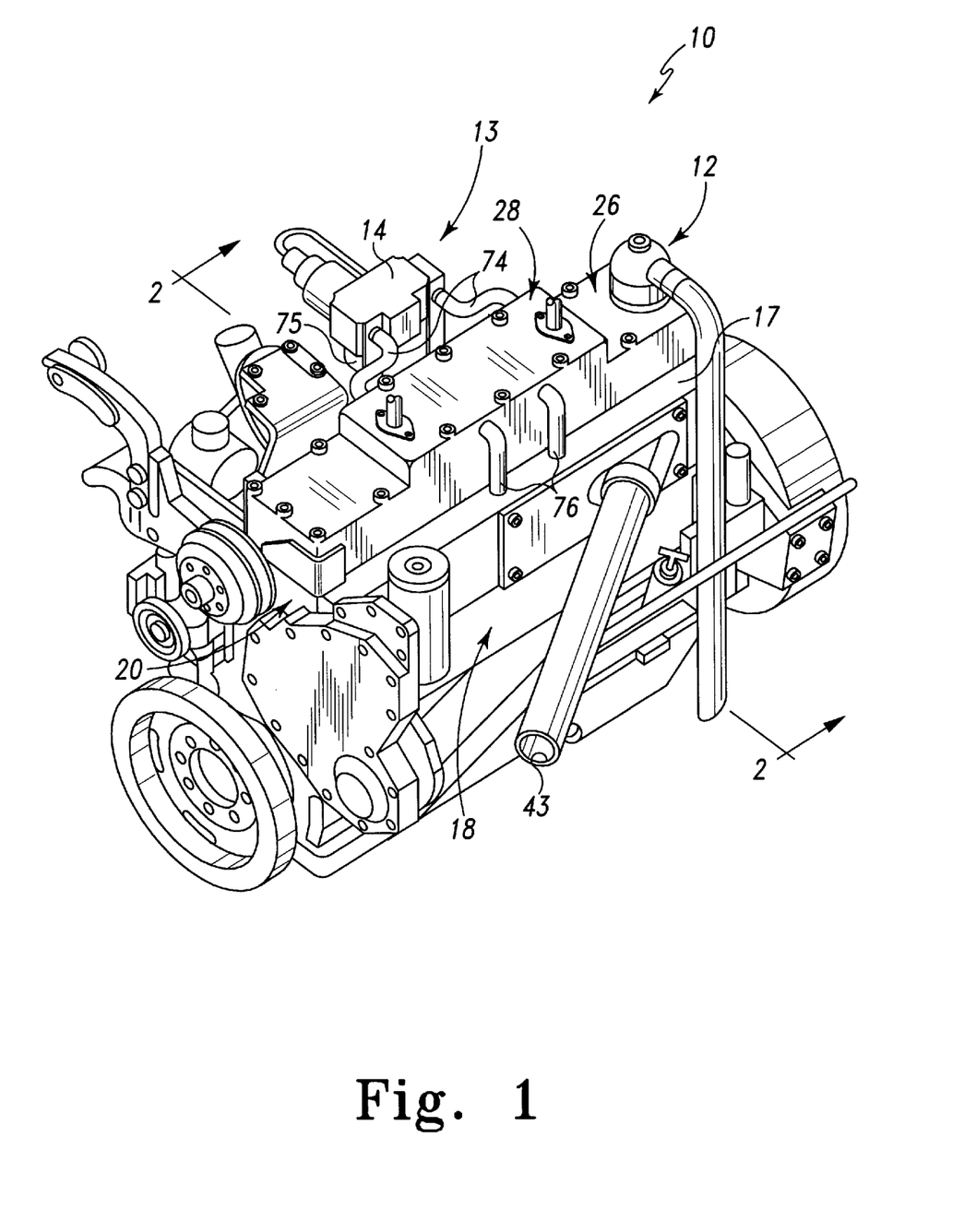
FIG. 1 is a perspective view of an internal combustion engine 10 which incorporates the features of the present invention therein.
Figure 2:
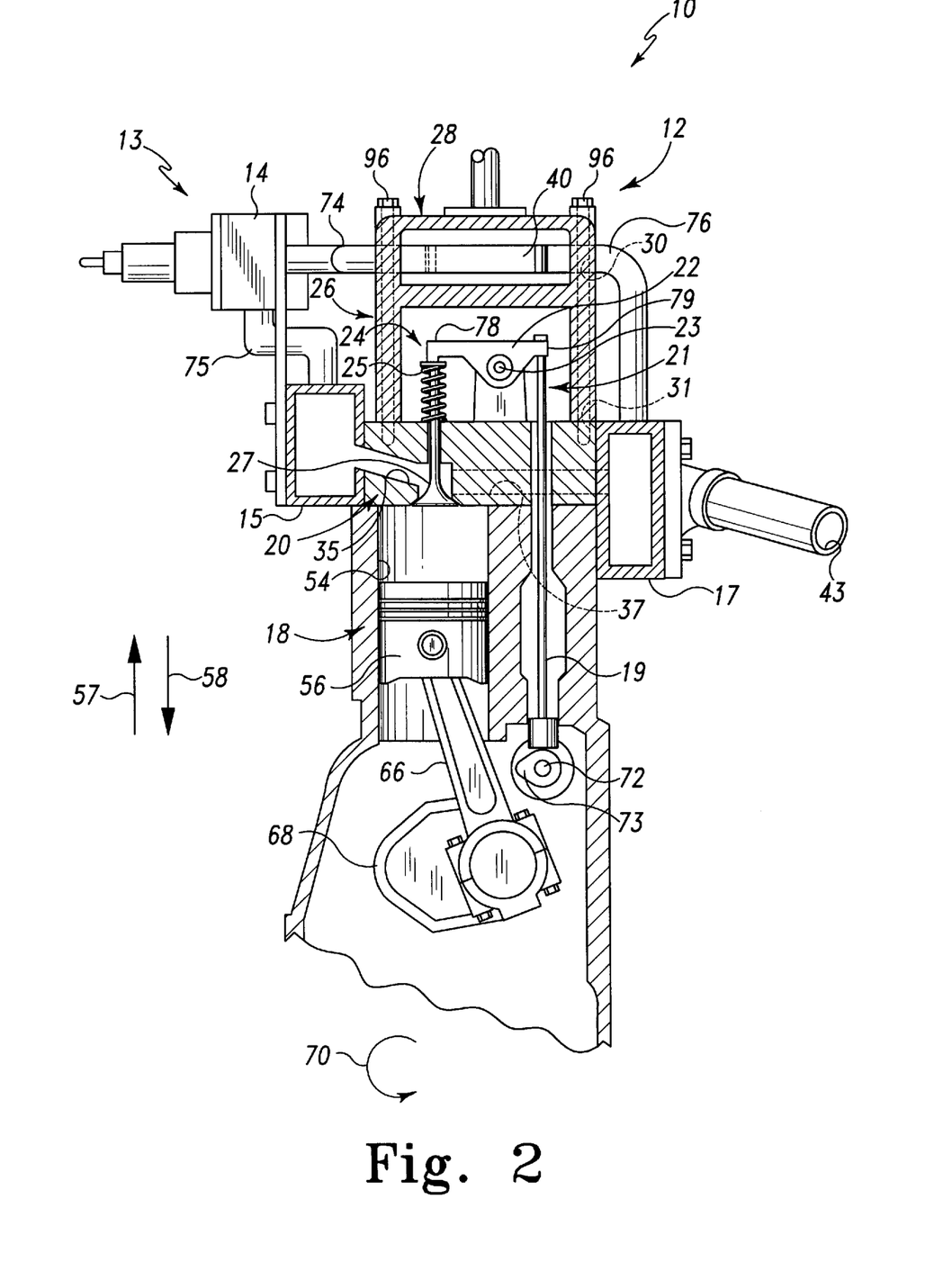
FIG. 2 is a partial cross sectional view of the internal combustion engine 10 taken along line 2—2 of FIG. 1, as viewed in the direction of the arrows.
Figure 3:
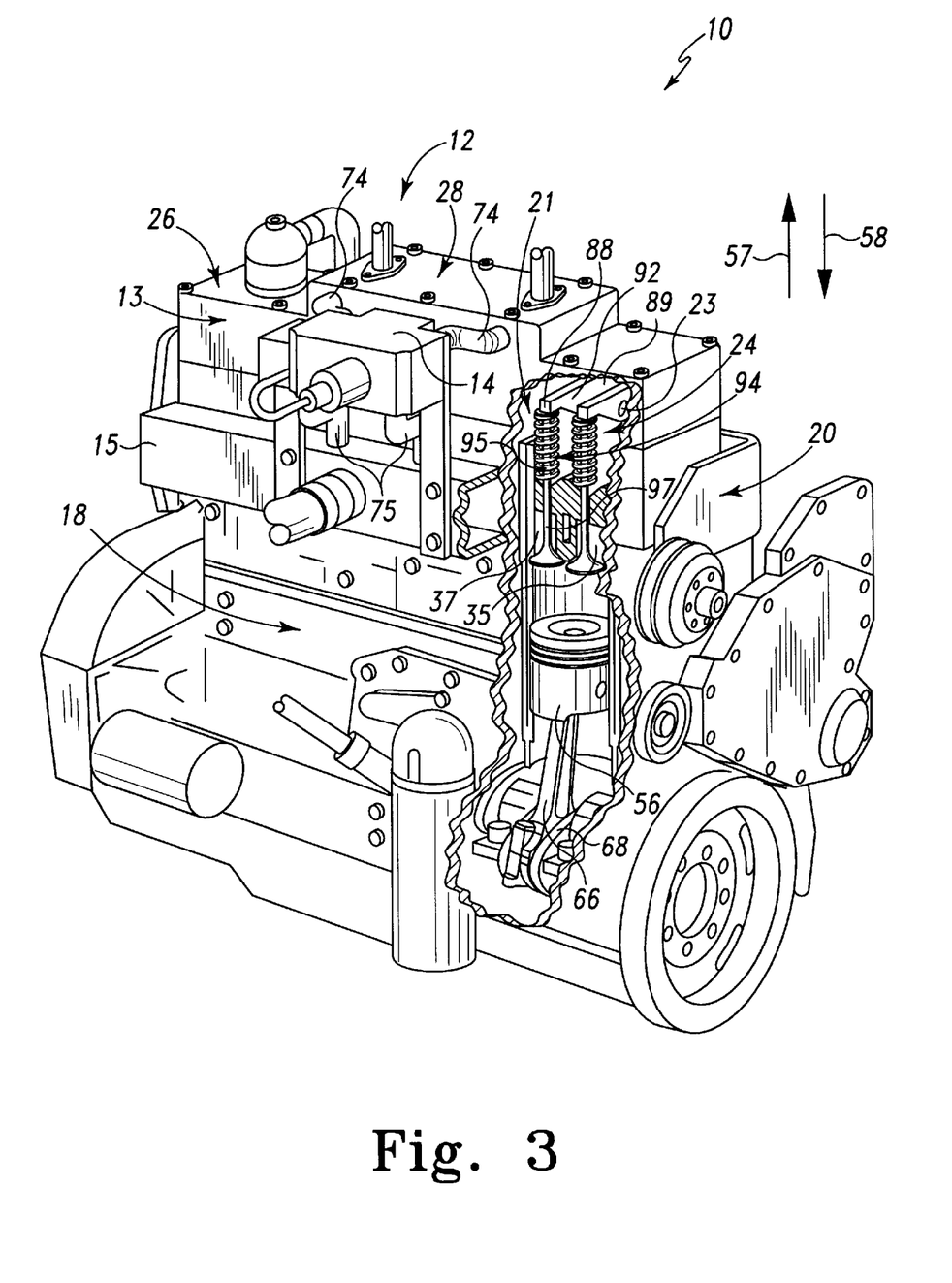
FIG. 3 is a perspective view of the internal combustion engine 10 of FIG. 1 with a portion of the engine head 20 and the engine block 18 cut away for clarity of description.

Referring now to FIGS. 1–3, there is shown an internal combustion engine 10 which is a cross flow diesel engine. The internal combustion engine 10 includes a valve cover assembly 12, an EGR assembly 13, an engine block 18, and an engine head 20.

The valve cover assembly 12 includes a cover portion 26 and a cooler portion 28. The cover portion 26 is sealably secured to the engine head 20 such that an engine lubricant, such as oil, is contained therein so as to lubricate a number of components associated with the internal combustion engine 10. More specifically, a valve cover aperture 30 is aligned with an engine block aperture 31. Thereafter a fastener, such as a bolt 96, is received through the valve cover aperture 30, and into the engine block aperture 31 thereby securing the valve cover assembly 12 to the engine head 20. A gasket (not shown) is interposed between the valve cover assembly 12 and the engine head 20. The securing process described above compresses the gasket, thereby sealing the valve cover assembly 12 to the engine head 20. As shall be discussed below in more detail, the cooler portion 28 of the valve cover assembly 12 cools the exhaust gases being advanced through the EGR assembly 13.

As shown in FIG. 2, the engine block 18 has a cylinder 54 defined therein. In a known manner, a piston 56 is operatively housed within the cylinder 54. In particular, during an upward stroke, the piston 56 translates in the general direction of arrow 57 of FIG. 2. During a downward stroke, the piston 56 translates in the general direction of arrow 58 of FIG. 2.

The piston 56 is coupled to a first end of a connecting rod 66, whereas a second end of the connecting rod 66 is connected to a crankshaft 68. During the upward stroke of the piston 56, the connecting rod 66 is likewise translated in the general direction of arrow 57 of FIG. 2. During the downward stroke of the piston 56, the connecting rod 66 is likewise translated in the general direction of arrow 58 of FIG. 2. In both cases, the crankshaft 68 rotates in the direction of arrow 70 of FIG. 2.

The engine head 20 includes an head air inlet port 37 and an head exhaust outlet port 35. An engine air inlet or intake manifold 17 places the head air inlet port 37 in fluid communication with an air intake line 43 associated with the internal combustion engine 10. An engine exhaust outlet or exhaust manifold 15 places the head exhaust outlet port 35 in fluid communication with an exhaust or tail pipe (not shown) associated with the internal combustion engine 10.

As shown in FIGS. 2 and 3, an upper portion of the engine head 20 includes a valve and rocker arm area 21. Within the valve and rocker arm area 21 is an exhaust valve assembly 24, an intake valve assembly 94, an exhaust rocker arm 22, and an intake rocker arm 92. It should be appreciated that when the cover portion 26 of the valve cover assembly 12 is secured to the engine head 20 as described above, the cover portion 26 covers the valve and rocker arm area 21 so as to protect the valve and rocker arm area 21 from contaminants such as dust and dirt.

When the exhaust valve assembly 24 is placed in a closed position, as shown in FIG. 2, the cylinder 54 is isolated from the head exhaust outlet port 35 and hence the exhaust manifold 15. When the exhaust valve assembly 24 is placed in an open position, the cylinder 54 is in fluid communication with the exhaust manifold 15 through the head exhaust outlet port 35. The exhaust valve assembly 24 includes an exhaust valve member 27 and an exhaust spring 25 concentrically mounted with the exhaust valve member 27. The exhaust spring 25 applies a force or bias to the exhaust valve member 27 that biases the exhaust valve assembly 24 into the closed position, as shown in FIG. 2. Hence, the exhaust valve assembly 24 is held in the closed position until urged by the exhaust rocker arm 22 into the open position.

The exhaust rocker arm 22 is movably secured to the engine head 20. In particular, the exhaust rocker arm 22 is free to pivot about a rocker shaft 23 which is non-movably secured to the engine head 20. A first end 78 of the exhaust rocker arm 22 is operatively coupled to the exhaust valve member 27, whereas a second end 79 of the exhaust rocker arm 22 is operatively coupled to a first end of an exhaust pushrod 19 (see FIG. 2). A second end of the exhaust pushrod 19 is operatively coupled to a camshaft 72.

The camshaft 72 includes a first cam lobe 73 which is moved into and out of contact with the second end of the exhaust pushrod 19 during rotation of the camshaft 72. When the cam lobe 73 is rotated into contact with the second end of the exhaust pushrod 19, the exhaust pushrod 19 is urged in the general direction of arrow 57 of FIG. 2. As the exhaust pushrod 19 is urged in the general direction of arrow 57, the exhaust rocker arm 22 pivots about the rocker shaft 23 thereby causing the first end 78 of the exhaust rocker arm 22 to be urged in the general direction of arrow 58 thereby likewise urging the exhaust valve member 27 in the general direction of arrow 58. When the force exerted on the exhaust valve member 27 by the first end 78 of the exhaust rocker arm 22 is greater in magnitude than the spring bias generated by the exhaust spring 25, the exhaust valve member 27 is moved in the general direction of arrow 58, thereby positioning the exhaust valve assembly 24 in the open position. When the camshaft 72 is rotated beyond the maximum height of the cam lobe 73, the spring bias of the exhaust spring 25 urges the exhaust valve member 27 in the general direction of arrow 57 thereby returning the valve assembly 24 to the closed position. It should be appreciated that as the exhaust valve member 27 is urged in the general direction of arrow 57 by the exhaust spring 25, the first end 78 of the exhaust rocker arm 22 is likewise urged in the general direction of arrow 57 which causes the exhaust rocker arm 22 to pivot about the rocker shaft 23 thereby causing the second end 79 of the exhaust rocker arm 22 to be urged in the general direction of arrow 58.

It should therefore be appreciated that as the exhaust valve assembly 24 is placed in the open position, exhaust gases within the cylinder 54 are allowed to flow from the cylinder 54, through the head exhaust outlet port 35, and into the exhaust manifold 15. It should further be appreciated that as the exhaust valve assembly 24 is placed in the closed position, the cylinder 54 is isolated from the exhaust manifold 15 thereby inhibiting advancement of the exhaust gases out of the cylinder 54.

Similarly, when the intake valve assembly 94 is placed in a closed position, as shown in FIG. 3, the cylinder 54 is isolated from the head air inlet port 37 and hence the intake manifold 17. When the intake valve assembly 94 is placed in an open position, the cylinder 54 is in fluid communication with the intake manifold 17 through the head air inlet port 37. As shown in FIG. 3, the intake valve assembly 94 includes an intake valve member 97 and an intake spring 95 concentrically mounted with the intake valve member 97. The intake spring 95 applies a force or bias to the intake valve member 97 that biases the intake valve assembly 94 into the closed position. Hence, the intake valve assembly 94 is held in the closed position until urged by the intake rocker arm 92 into the open position.

The intake rocker arm 92 is movably secured to the engine head 20. In particular, the intake rocker arm 92 is free to pivot about the rocker shaft 23. A first end 88 of the intake rocker arm 92 is operatively coupled to the intake valve member 97, whereas a second end 89 of the intake rocker arm 92 is operatively coupled to a first end of an intake pushrod (not shown). The second end of the intake pushrod is operatively coupled to the camshaft 72.

The camshaft 72 includes a second cam lobe (not shown) which is moved into and out of contact with the second end of the intake pushrod during rotation of the camshaft 72. When the cam lobe is rotated into contact with the intake pushrod, the intake pushrod is urged in the general direction of arrow 57 of FIG. 3. As the intake pushrod is urged in the general direction of arrow 57, the intake rocker arm 92 pivots about the rocker shaft 23 thereby causing the first end 88 of the intake rocker arm 92 to be urged in the general direction of arrow 58 of FIG. 3 thereby likewise urging the intake valve member 97 in the general direction of the arrow 58. When the force exerted on the intake valve member 97 by the first end 88 of the intake rocker arm 92 is greater in magnitude than the spring bias generated by the intake spring 95, the intake valve member 97 is moved in the general direction of arrow 58 thereby positioning the intake valve assembly 94 in the open position. When the camshaft 72 is rotated beyond the maximum height of the cam lobe that is acting upon the intake pushrod, the spring bias of the intake spring 95 urges the intake valve member 97 in the general direction of arrow 57, thereby returning the intake valve assembly 94 to the closed position. It should be appreciated that as the intake valve member 97 is urged in the general direction of arrow 57 by the intake spring 95, the first end 88 of the intake rocker arm 92 is likewise urged in the general direction of arrow 57 which causes the intake rocker arm 92 to pivot about the rocker shaft 23 thereby causing the second end 89 of the intake rocker arm 92 to be urged in the general direction of arrow 58.

It should therefore be appreciated that as the intake valve assembly 94 is placed in the open position, air (along with any exhaust gases which have been routed to the intake manifold 17 by the EGR assembly 13) within the intake manifold 17 is advanced through the head air inlet port 37, and into the cylinder 54. It should be further appreciated that as the intake valve assembly 94 is placed in the closed position, the cylinder 54 is isolated from intake manifold 17 thereby inhibiting advancement of air from the intake manifold 17 into the cylinder 54.

The internal combustion engine 10 is a four stroke engine. The first stroke is an intake stroke, during which the exhaust valve assembly 24 is positioned in the closed position and the intake valve assembly 94 is positioned in the open position. Furthermore, during the intake stroke, the piston 56 is advanced in the general direction of arrow 58 thereby creating a partial vacuum in the cylinder 54. This partial vacuum causes air to be advanced from the intake manifold 17, through the head air inlet port 37, and into the cylinder 54. Advancing to a compression stroke, the intake valve assembly 94 and the exhaust valve assembly 24 are both positioned in their respective closed positions. As the piston 56 moves upward in the general direction of arrow 57, it compresses the air in the cylinder 54. As the piston 56 continues to advance toward a top of its stroke, a fuel, such as diesel fuel, is introduced into the cylinder 54 thereby creating a fuel and air mixture with the air present in the cylinder 54. Near the top of the stroke of the piston 56, the fuel and air mixture is ignited by the heat generated as a result of compressing the fuel and air mixture. Ignition of the fuel and air mixture advances the internal combustion engine 10 to a power stroke in which the intake valve assembly 94 and the exhaust valve assembly 24 are both positioned in their respective closed positions. The fuel and air mixture is combusted and exhaust gases are formed. The formation of the exhaust gases generates pressure. This pressure acts upon the piston 56 to create a force which drives the piston 56 in the general direction of arrow 58. Thereafter, the internal combustion engine 10 is advanced to an exhaust stroke during which the exhaust valve assembly 24 is positioned in the open position and the intake valve assembly 94 is positioned in the closed position. Since the pressure generated by the exhaust gases in the cylinder 54 is greater than the pressure in the exhaust manifold 15, the exhaust gases advance from the cylinder 54, through the head exhaust outlet port 35, and into the exhaust manifold 15.

During certain operating conditions of the internal combustion engine 10, it is desirable to inhibit the formation of $NO_x$ by introducing chemically inert exhaust gases into the cylinder 54 during the intake stroke. Hence, the EGR assembly 13 routes exhaust gases from the exhaust manifold 15 to the intake manifold 17. In particular, the EGR assembly 13 includes an EGR valve 14 which selectively places the exhaust manifold 15 in fluid communication with the intake manifold 17 during such operating conditions.

Exhaust gases are routed through the valve cover assembly 12 so as to be cooled prior to being advanced into the intake manifold 17. In particular, as shown in FIG. 2, an inlet of the EGR valve 14 is coupled to the exhaust manifold 15 via a pair of tubes or lines 75, whereas an outlet of the EGR valve 14 is coupled to the intake manifold 17 via a pair of tubes or lines 74, a pair of conduits 40 (see FIG. 7) associated with the cooler portion 28 of the valve cover assembly 12, and a pair of tubes or lines 76. Thus, opening the EGR valve 14 places the exhaust manifold 15 in fluid communication with the intake manifold 17 via a fluid path that includes the lines 75, the EGR valve 14, the lines 74, the conduits 40, and the lines 76. Therefore, it should be appreciated that exhaust gases are advanced from the exhaust manifold 15 to the intake manifold 17 when the EGR valve 14 is opened.

Referring now to FIGS. 4–7, the cooler portion 28 of valve cover assembly 12 is shown in more detail. The cooler portion 28 includes a housing 87 which has a chamber 46 defined therein. The conduits 40 are positioned in the chamber 46. In particular, each of the conduits 40 is at one end received through an exhaust inlet 36 defined in the housing 87, and at the opposite end received through an exhaust outlet 38 also defined in the housing 87 (see FIG. 7). The conduits 40 are sealed in order to be isolated from the chamber 46 thereby preventing the exhaust gases that pass through the conduits 40 from escaping into the chamber 46.

Figure 4:
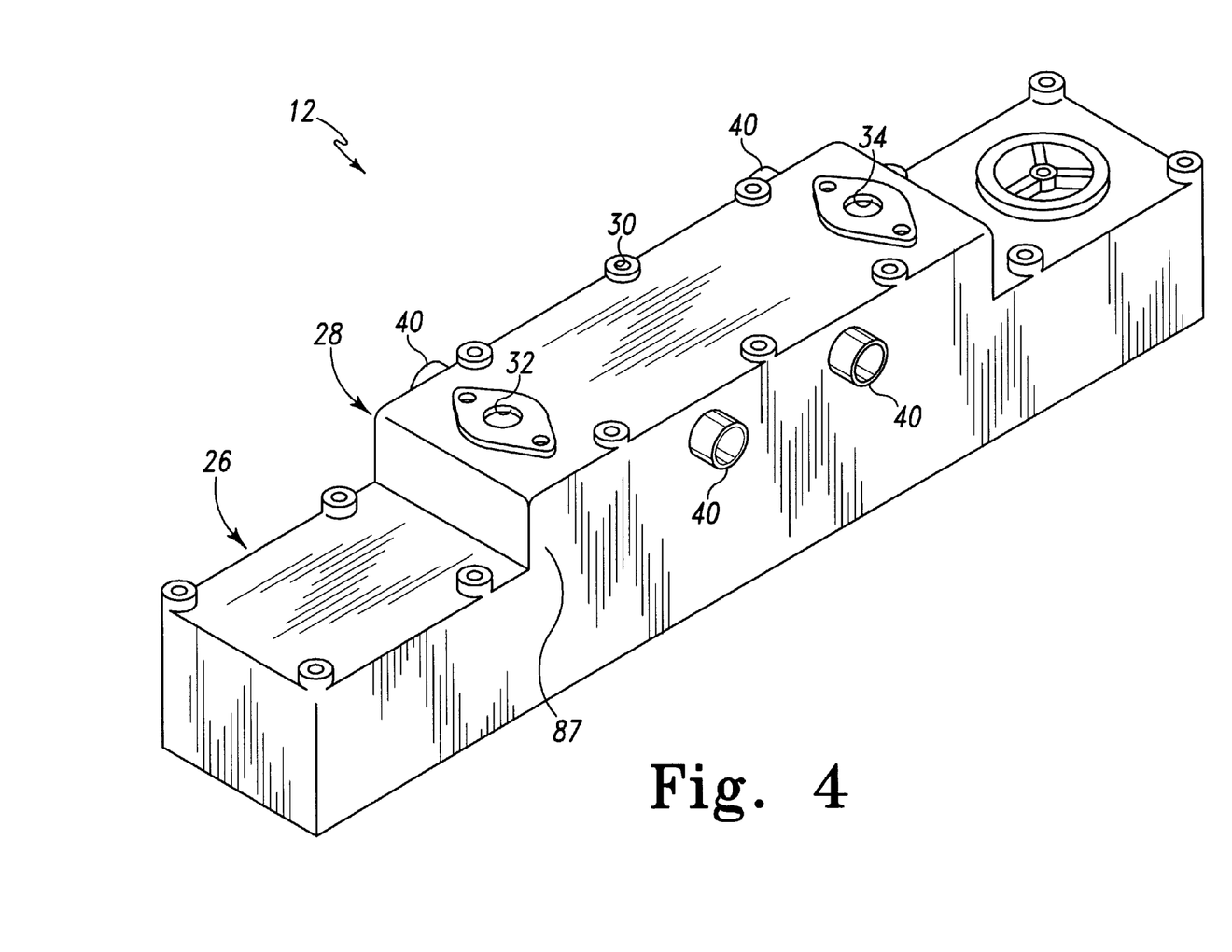
FIG. 4 is an enlarged perspective view of the valve cover assembly 12 of the internal combustion engine 10 of FIG. 1.
Figure 5:
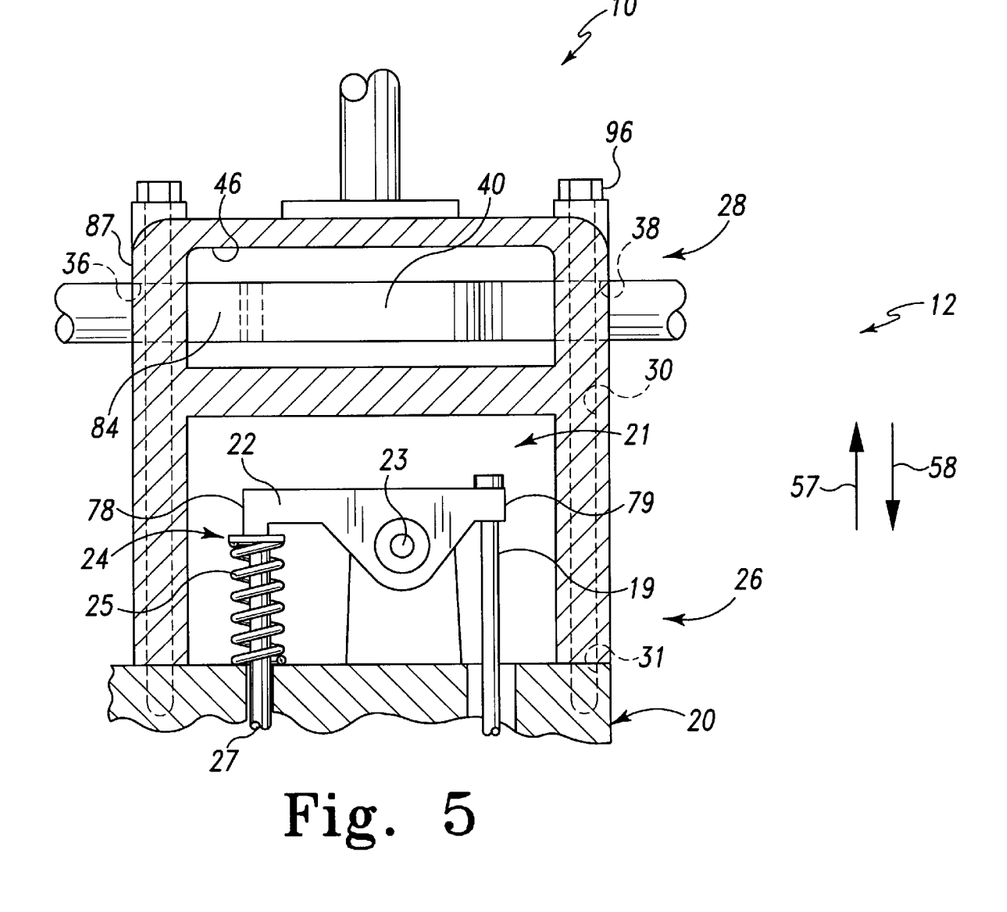
FIG. 5 is an enlarged view of a portion of the internal combustion engine 10 shown in FIG. 2.

The housing 87 further has a coolant inlet 32 and a coolant outlet 34 defined therein (see FIG. 4). The coolant inlet 32 and the coolant outlet 34 allow the passage of fluid into and out of the chamber 46. In particular, a coolant, such as a liquid engine coolant, is introduced into the chamber 46 through the coolant inlet 32. The coolant then fills the entire chamber 46, except for the volume taken up by the conduits 40. As additional coolant is introduced into the chamber 46, coolant is displaced or otherwise forced out of the chamber 46 through the coolant outlet 34. It should be appreciated that when present in the chamber 46, the engine coolant is in thermal communication with a conduit wall 84 of the conduits 40.

Figure 6:
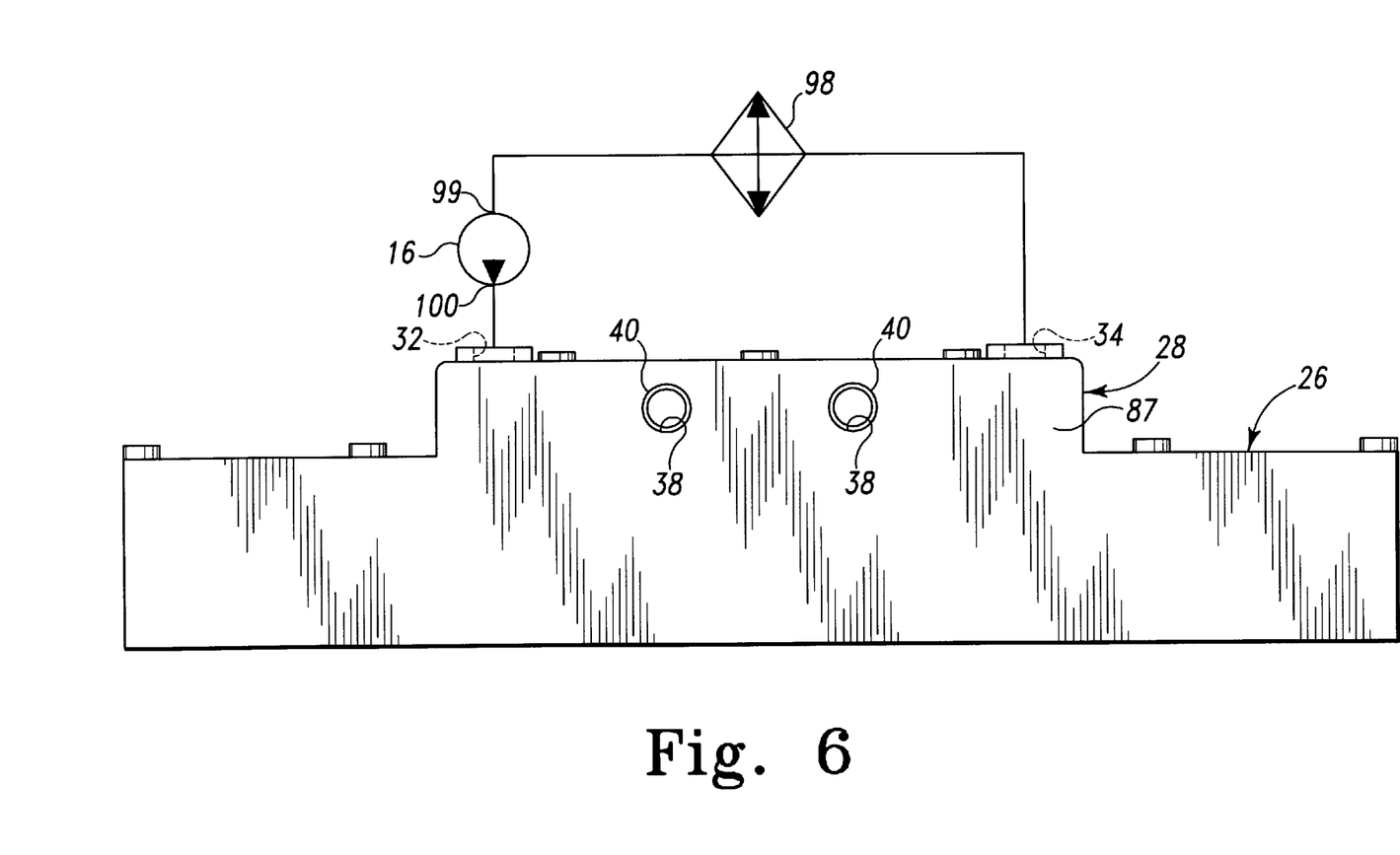
FIG. 6 is a side elevational view of the valve cover assembly 12 of the internal combustion engine 10 of FIG. 1, with the valve cover assembly 12 being shown schematically coupled to the water pump 16 and radiator 98.

The internal combustion engine 10 further includes a water pump 16 and a radiator 98 (see FIG. 6). The water pump 16 includes a pump inlet 99 and a pump outlet 100. The pump outlet 100 is coupled to the coolant inlet 32 of the cooler portion 28. The coolant outlet 34 of the cooler portion 28 is coupled to an inlet of the radiator 98. An outlet of the radiator 98 is then coupled to the pump inlet 99 of the water pump 16. Thus, operation of the water pump 16 advances coolant from the water pump 16, through the chamber 46, through the radiator 98, and back to the water pump 16.

Figure 7:
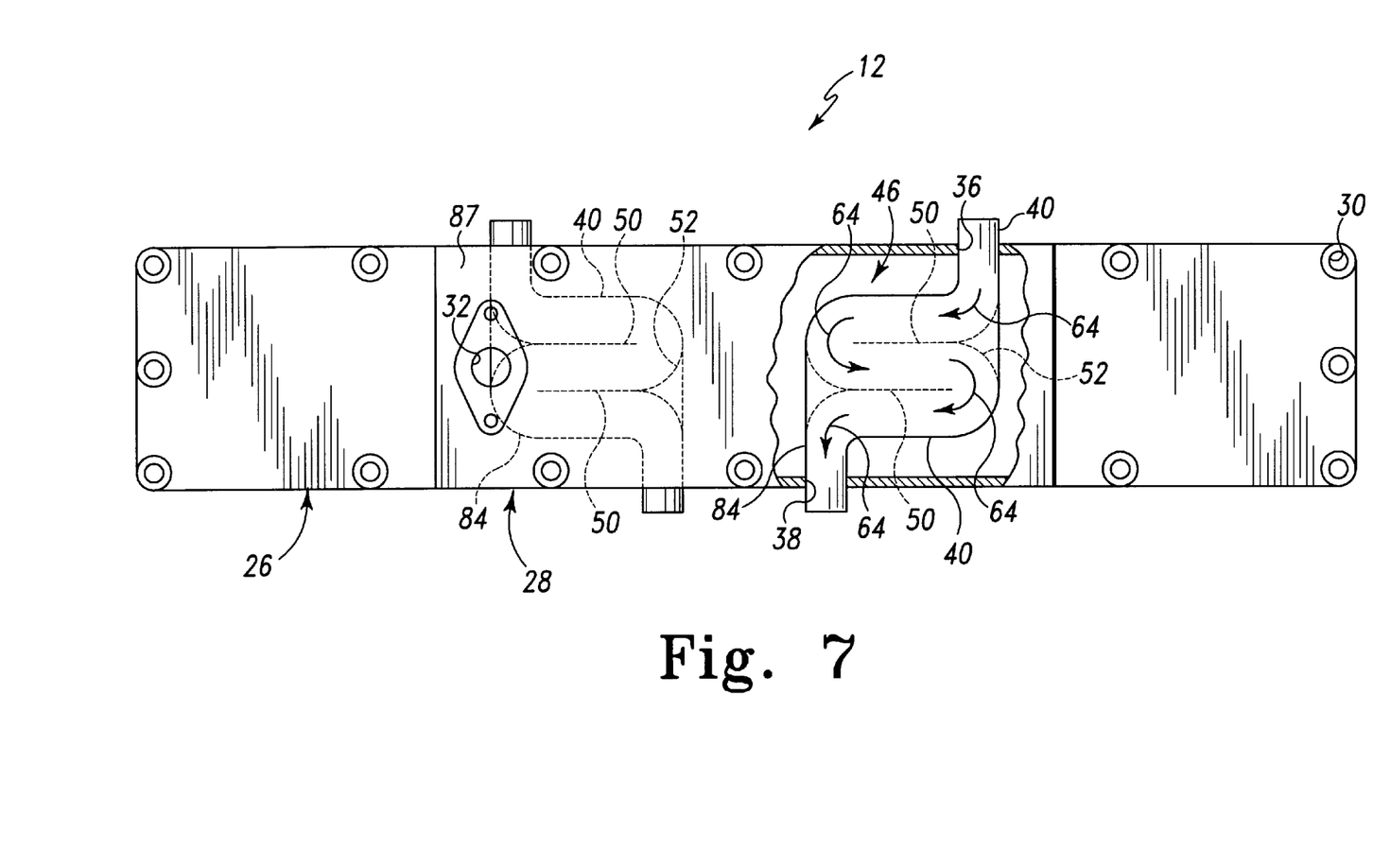
FIG. 7 is a top elevational view of the valve cover assembly 12 of the internal combustion engine 10 of FIG. 1 with a portion of its housing 87 cut away for clarity of description.

Each of the conduits 40 within the chamber 46 includes a number of baffles 50 and fillets 52 (see FIG. 7). The baffles 50, the fillets 52, and the conduit wall 84 cooperate to define a serpentine path or segment within the conduits 40, as shown in FIG. 7. When the EGR valve 14 is open, exhaust gases enter the cooler portion 28 through a portion of the conduits 40 positioned in the exhaust inlet 36. Upon entering the conduits 40, exhaust gases follow the path indicated by arrows 64 of FIG. 7 through the conduits 40, before exiting through a portion of the conduits 40 positioned in the exhaust outlet 38. Such a serpentine path defines a number of contact surfaces (e.g. the baffles 50, the fillets 52, and the conduit wall 84) into which the exhaust gases are directed, thereby creating a number of thermal paths through which heat may be dissipated from the exhaust gases to the coolant in the chamber 46.

INDUSTRIAL APPLICABILITY

In operation, it is desirable to inhibit the formation of $NO_x$ under certain engine operating conditions. Hence, during such operating conditions, an engine control module (not shown) associated with the internal combustion engine 10 generates a control signal which is sent to the EGR valve 14, thereby causing the EGR valve 14 to be positioned in the open position. Hot exhaust gases are then advanced from the exhaust manifold 15 through the lines 75, through the opened EGR valve 14, and into the lines 74. Thereafter, the exhaust gases are advanced through the portion of the conduits 40 positioned in the exhaust inlet 36 of the cooler portion 28. Upon entering the conduits 40, the exhaust gases are routed along the serpentine path as indicated by the arrows 64 of FIG. 7. As the exhaust gases strike or otherwise contact the conduit wall 84 of the conduits 40, the baffles 50, and the fillets 52, heat is dissipated from the exhaust gases to the conduit wall 84, the baffles 50, and the fillets 52. Heat is then transferred through the conduit wall 84, the baffles 50, and the fillets 52 to the coolant within the chamber 46. The exhaust gases are then advanced out of the portion of conduits 40 positioned in exhaust outlet 38, through lines 76, and into the intake manifold 17.

Heat transferred to the coolant is removed from the chamber 46 as the coolant is displaced or otherwise forced out of the chamber 46 through the coolant outlet 34. In particular, the heated coolant from the coolant outlet 34 is advanced to the radiator 98 which removes heat from the coolant in a known manner. From the radiator 98, the coolant is then advanced through the water pump 16 prior to being advanced to the coolant inlet 32 once again.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the cooler portion 28 is described herein as having two conduits positioned therein, and has significant advantages thereby in the present invention, any number of conduits 40 may be positioned in the chamber 46 of the cooler portion 28 and still achieve many of the advantages of the present invention. For example, the chamber 46 may have one conduit 40 positioned therein.

It should also be appreciated that the conduit wall 84 of the conduits 40 may be configured to include a number of outwardly extending fins that extend into the chamber 46 to enhance the heat transfer efficiency from the conduits 40 to the coolant within the chamber 46.

It should further be appreciated that while the cooler portion 28 is positioned between the EGR valve 14 and the intake manifold 17 in the present invention and has significant advantages thereby, many of the advantages of the present invention may be achieved by other configurations. For example, the cooler portion 28 may be positioned between the exhaust manifold 15 and the EGR valve 14 such that exhaust gases are cooled in the cooler portion 28 prior to being advanced to the EGR valve 14. This configuration would still allow the exhaust gases to be advanced from exhaust manifold 15 and through the cooler portion 28 of the valve cover assembly 12 prior to being advanced to the intake manifold 17. However, since the exhaust gases would be cooled prior to advancing to the EGR valve, such a variation may be desirable if hot exhaust gases adversely affect the performance of a given EGR valve design.

It should also be appreciated that although the internal combustion engine 10 is herein described as a diesel engine, other types of engines are also contemplated for use with the present invention. For example, the internal combustion engine 10 could be either a gasoline or a multi-fuel engine.

Moreover, it should be appreciated that pushrod actuation of the exhaust valve assembly 24 and the intake valve assembly 94 is exemplary in nature. The internal combustion engine 10 could include an overhead camshaft for actuating the exhaust valve assembly 24 and the intake valve assembly 94.

What is claimed is:

1. A method of covering a valve and rocker arm area of an internal combustion engine, the engine having an engine exhaust outlet and an engine air inlet, comprising the steps of:

providing a valve cover assembly which includes (1) a housing having a chamber defined therein, and (2) a conduit positioned in the chamber, the conduit connecting the engine exhaust outlet to the engine air inlet;

securing the valve cover assembly to the engine so that the cover portion of the valve cover assembly covers the valve and rocker arm area;

advancing exhaust gas from the engine exhaust outlet to the engine air inlet through the conduit; and advancing fluid through the housing so as to cool the conduit.

2. The method of claim 1, wherein the housing of the valve cover assembly defines a coolant inlet, a coolant outlet, further comprising the steps of:

providing a water pump having a pump inlet and a pump outlet; and operating the water pump so as to advance fluid (1) from the pump outlet of the water pump to the coolant inlet of the housing, and (2) from the coolant outlet of the housing to the pump inlet of the water pump.

3. The method of claim 1, wherein:

the housing of the valve cover assembly further defines a housing exhaust inlet and a housing exhaust outlet, and the exhaust advancing step includes the steps of (1) advancing exhaust gas from the engine exhaust outlet to the housing exhaust inlet, and (2) advancing exhaust gas from the housing exhaust outlet to the engine air inlet.

4. The method of claim 3, wherein:

the conduit includes a serpentine segment which is located within the housing, and the fluid advancing step includes the step of advancing fluid through the serpentine segment of the conduit.

5. The method of claim 1, wherein:

the housing has a first aperture defined therein, the internal combustion engine includes an engine head having a second aperture defined therein, and the securing step includes the steps of (1) aligning the first aperture with the second aperture, and (2) positioning a fastener in both the first aperture and the second aperture so as to secure the valve cover assembly to the engine head.

6. An engine assembly, comprising:

an internal combustion engine having a valve and rocker arm area;

a housing having a chamber defined therein, said housing further defining a coolant inlet, a coolant outlet, a first housing exhaust inlet, and a first housing exhaust outlet, said housing further having a cover portion mounted to said engine so as to cover said valve and rocker arm area; and a first conduit positioned in said chamber which connects said first housing exhaust inlet to said first housing exhaust outlet.

7. The engine assembly of claim 6, wherein said engine includes an engine air inlet and an engine exhaust outlet, further comprising:

a first tube connected between said engine exhaust outlet and said first housing exhaust inlet; and a second tube connected between said first housing exhaust outlet and said engine air inlet.

8. The engine assembly of claim 7, further comprising a water pump having a pump inlet and a pump outlet, wherein:

said pump outlet of said water pump is in fluid communication with said coolant inlet of said housing, and said coolant outlet of said housing is in fluid communication with said pump inlet of said water pump.

9. The engine assembly of claim 6, wherein said first conduit includes a serpentine segment which is located within said housing.

10. The engine assembly of claim 6, wherein said housing further defines a second housing exhaust inlet and a second housing exhaust outlet, further comprising:

a second conduit positioned in said chamber which connects said second housing exhaust inlet to said second housing exhaust outlet.

11. The engine assembly of claim 6, further comprising a fastener, wherein:

said housing has a first aperture defined therein, said internal combustion engine includes an engine head having a second aperture defined therein, said first aperture is aligned with said second aperture, and said fastener is positioned in both said first aperture and said second aperture so as to secure said housing to said engine head.

12. A valve cover assembly for use on an internal combustion engine, comprising:

a housing having a chamber defined therein, said housing further defining a coolant inlet, a coolant outlet, a first housing exhaust inlet, and a first housing exhaust outlet, said housing further having a cover portion which covers a valve and rocker arm area of said engine; and a first conduit positioned in said chamber which connects said first housing exhaust inlet to said first housing exhaust outlet.

13. The valve cover assembly of claim 12, wherein said first conduit includes a serpentine segment which is located within said housing.

14. The valve cover assembly of claim 12, wherein said housing further defines a second housing exhaust inlet and a second housing exhaust outlet, further comprising:

a second conduit positioned in said chamber which connects said second housing exhaust inlet to said second housing exhaust outlet.

15. The valve cover assembly of claim 12, further comprising a fastener, wherein:

said housing has a first aperture defined therein, said internal combustion engine includes an engine head having a second aperture defined therein, said housing is securable to said engine head, and said housing is secured to said engine head when said fastener is positioned in both said first aperture and said second aperture.

16. The valve cover assembly of claim 12, wherein:

said housing is securable to said internal combustion engine, said internal combustion engine includes a water pump having a pump inlet and a pump outlet, said pump outlet of said water pump is in fluid communication with said coolant inlet of said housing when said housing is secured to said internal combustion engine, and said coolant outlet of said housing is in fluid communication with said pump inlet of said water pump when said housing is secured to said internal combustion engine.

17. The valve cover assembly of claim 12, wherein:

said internal combustion engine includes an engine air inlet and an engine exhaust outlet, said housing is securable to said internal combustion engine, said first conduit is in fluid communication with said engine exhaust outlet when said housing is secured to said internal combustion engine, and said first conduit is further in fluid communication with said engine air inlet when said housing is secured to said internal combustion engine.

* * * * *